United States Patent
Cohen et al.

(10) Patent No.: US 10,505,953 B2
(45) Date of Patent: Dec. 10, 2019

(54) PROACTIVE PREDICTION AND MITIGATION OF CYBER-THREATS

(71) Applicant: Empow Cyber Security Ltd., Ramat Gan (IL)

(72) Inventors: Rami Cohen, Haifa (IL); Avi Chesla, Tel-Aviv (IL); Shlomi Medalion, Lod (IL); Ron Katz, Mazkeret Batia (IL)

(73) Assignee: Empow Cyber Security Ltd., Ramat Gan (IL)

( * ) Notice: Subject to any disclaimer, the term of this patent is extended or adjusted under 35 U.S.C. 154(b) by 354 days.

(21) Appl. No.: 15/433,647

(22) Filed: Feb. 15, 2017

(65) Prior Publication Data

US 2018/0234435 A1 Aug. 16, 2018

(51) Int. Cl.
*H04L 29/06* (2006.01)

(52) U.S. Cl.
CPC ...... *H04L 63/1416* (2013.01); *H04L 63/1441* (2013.01); *H04L 63/145* (2013.01); *H04L 63/1433* (2013.01); *H04L 63/1483* (2013.01)

(58) Field of Classification Search
CPC ............. H04L 63/1416; H04L 63/1433; H04L 63/1408; H04L 63/1441; H04L 63/20; H04L 63/145; H04L 63/1483; G06F 21/577; G06F 21/552; G06F 21/554; G06F 21/55; H04W 12/08
USPC ..................................... 726/23, 25; 709/224
See application file for complete search history.

(56) References Cited

U.S. PATENT DOCUMENTS

| | | | |
|---|---|---|---|
| 7,933,989 B1 | 4/2011 | Barker et al. | |
| 8,150,783 B2 | 4/2012 | Gonsalves et al. | |
| 8,572,750 B2 | 10/2013 | Patel et al. | |
| 8,800,045 B2 | 8/2014 | Curtis et al. | |
| 9,654,485 B1* | 5/2017 | Neumann | H04L 63/1416 |
| 2004/0114519 A1 | 6/2004 | MacIsaac | |
| 2004/0143756 A1 | 7/2004 | Munson et al. | |
| 2012/0096549 A1 | 4/2012 | Amini et al. | |
| 2012/0304007 A1 | 11/2012 | Hanks et al. | |
| 2013/0198840 A1 | 8/2013 | Drissi et al. | |
| 2013/0276122 A1 | 10/2013 | Sowder | |
| 2014/0215618 A1 | 7/2014 | Amit | |
| 2014/0283026 A1 | 9/2014 | Amit et al. | |
| 2014/0283050 A1 | 9/2014 | Amit | |
| 2014/0337974 A1 | 11/2014 | Joshi et al. | |

OTHER PUBLICATIONS

The International Search Report and the Written Opinion of the International Searching Authority for PCT/US2015/039664, ISA/RU, Moscow, Russia, dated Oct. 15, 2015.
The International Search Report and the Written Opinion of the International Searching Authority for PCT/US2015/060109, ISA/RU, Moscow, Russia, dated Mar. 10, 2016.

* cited by examiner

*Primary Examiner* — Brian F Shaw
(74) *Attorney, Agent, or Firm* — M&B IP Analysts, LLC (57) ABSTRACT

A cyber-security system and method for proactively predicting cyber-security threats are provided. The method comprises receiving a plurality of security events classified to different groups of events; correlating the plurality of received security events to classify potential cyber-security threats to a set of correlation types; determining a correlation score for each classified potential cyber-security threat; and determining a prediction score for each classified potential cyber-security threat, wherein the prediction score is determined based in part on the correlation score.

35 Claims, 8 Drawing Sheets

PROACTIVE PREDICTION AND MITIGATION OF CYBER-THREATS

TECHNICAL FIELD

The present disclosure generally relates to cybersecurity systems, and more particularly to cybersecurity systems for automatic prediction of cyber-threats.

BACKGROUND

The Internet provides access to various pieces of information, applications, services, and the like for publishing information. Today, the Internet has significantly changed the way we access and use information. The Internet allows users to quickly and easily access services such as banking, e-commerce, e-trading, and other services people use in their daily lives.

In order to access such services, a user often shares his or her personal information such as name; contact details; highly confidential information such as usernames, passwords, bank account numbers, and credit card details; and so on with service providers. Similarly, confidential information of companies such as trade secrets, financial details, employee details, company strategies, and the like are also stored on servers that are connected to the Internet. There is a threat that confidential and/or personal information will be accessed by hackers using unauthorized access methods. Specifically, such unauthorized access methods may include, for example, using malware, viruses, spyware, key loggers, compromised remote desktop services, and the like.

Recently, the frequency and complexity level of attacks has increased with respect to attacks performed against all organizations including, but not limited to, cloud providers, enterprise organizations, and network carriers. Some complex attacks, known as multi-vector attack campaigns, utilize different types of attack techniques to identify weaknesses in the target network and/or application resources. Identified weaknesses can be exploited to achieve the attack's goals, thereby compromising the entire security framework of the network.

One example of a multi-vector attack campaign is an advanced persistent threat (APT). An APT is an attack in which an unauthorized hacker gains access to a network and remains undetected for a long period of time. Due to the complexity of multi-vector attack campaigns, such attacks are frequently successful and go undetected by current security solutions. This is due to the fact that current security solutions are not sufficiently agile and adaptive with respect to detection, investigation, and mitigation of resources needed to meet such evolving threats. Specifically, current security solutions cannot easily and promptly adapt to detect and mitigate new attack behavior or attacks that change their behavior in a significant manner in order to bypass the security.

In addition, security solutions and, in particular, solutions for APT attacks, do not provide reliable automatic decision-making capabilities. Typically, security solutions are not designed for both detection and automatic decision-making. In addition, system administrators do not trust currently available security solutions' designed to mitigate complex attacks due, in part, to the high level of false positive alerts generated by such systems because of inaccurate mitigation control. As a result of such false positive alerts, system administrators often manually perform decision-making processes rather than permit automatic decision-making, which usually increases the time needed to mitigate attacks.

As such, current solutions cannot predict potential risks such as future activities that are associated with pre-attack intelligence gathering, malware propagation, data breach, and exfiltration of data. Current solutions also suffer from a lack of situational awareness of the main risks and loss potential that attacks can impose on a business.

Furthermore, due to the lack of automatic decision-making, remediation and/or mitigation actions are not well defined and prioritized, thereby resulting in inefficient utilization of security resources such as investigation resources and mitigation resources. Specifically, mitigation actions cannot be automatically activated in advance in order to protect the victims from future exploitation attempts, protect before a protected object is victimized or exploited. Current solutions do not even offer an advance or proactive mitigation when a mitigation action is executed against the attacker. For example, if an attacker carries out an ATP attack against a specific target and such an attack is detected and mitigated, current solutions are not designed to automatically and proactively mitigate propagation of the attack against other targets. Thus, current solutions are limited in the defense that they can provide to protected objects and are further limited in their ability to block the expansion of cyber-threats, and particularly of multi-vector attack campaigns (e.g. APTs).

It would therefore be advantageous to provide a security solution that would at least overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for proactively predicting cyber-security threats. The method comprises receiving a plurality of security events classified to different groups of events; correlating the plurality of received security events to classify potential cyber-security threats to a set of correlation types; determining a correlation score for each classified potential cyber-security threat; and determining a prediction score for each classified potential cyber-security threat, wherein the prediction score is determined based in part on the correlation score.

Some embodiments disclosed herein further include a cyber-security system for proactively predicting cyber-security threats. The system comprises a processing circuitry; and a memory, the memory containing instructions that, when executed by the processing circuitry, configure the system to: receive a plurality of security events classified to different groups of events; correlate the plurality of received security events to classify potential cyber-security threats to a set of correlation types; determine a correlation score for each classified potential cyber-security threat; and determine a prediction score for each classified potential cyber-security threat, wherein the prediction score is determined based in part on the correlation score.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, the various disclosed embodiments include a method and system for proactive mitigation of cyber-threats. The proactive mitigation enables the mitigation of any on-going and expected attacks (including multi-vector attacks) in advance, thereby blocking the propagation of attacks and their consequences in advance. The disclosed methods are based on detecting correlations between premature attacks and existing and old advanced attacks and also between premature branches of advanced attacks and advanced branches of the attacks. In an embodiment, the correlation is based on a pattern correlation process as described in detail herein below.

Upon detection of such a correlation, a decision of whether to proactively mitigate an on-going or an expected attack is performed. As discussed in detail below, the decision is based on the pattern correlation process, a threat type and its associated attack risk level, and a security policy set by the organization.

Figure 1:
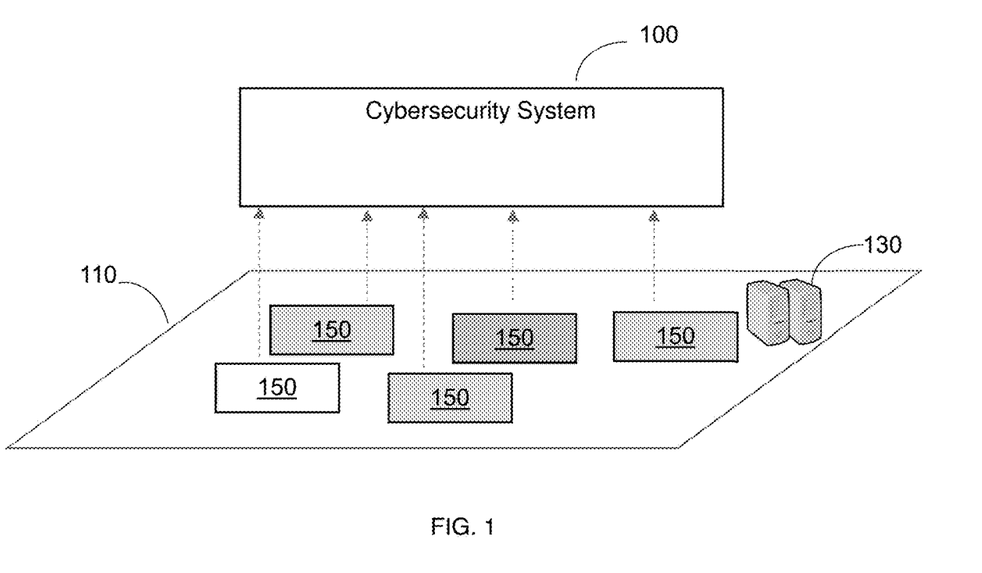
FIG. 1 is a network diagram illustrating deployment of a cybersecurity system utilized to describe the various disclosed embodiments.

FIG. 1 is an example network diagram illustrating deployment of a cyber-security system 100 demonstrating the operation of the disclosed embodiments. The cyber-security system 100 is configured to protect an entity (hereinafter a "protected entity") 130 communicatively connected in a network 110. The cyber security system 100 is also communicatively connected to the network 110. The network 110 may be, but is not limited to, a virtualized network, a software defined network (SDN), a hybrid network, a cloud services network, or any combination thereof. In an embodiment, the cyber-security system 100 is configured to operate in detection, investigation, and mitigation phases.

The cybersecurity system 100 can interface with SDN-based network elements or "legacy" network elements (not shown) in the network 110. The cybersecurity system 100 supports bi-directional communication drivers to allow communication with the data-plane elements including configurations, policy read, and logs collection. Examples for such drivers are provided below.

The cybersecurity system 100 can also interface with a plurality of security products 150. The security products 150 are typically designed to protect against cyber-threats with different detection, investigation and mitigation techniques. The security products 150 are utilized to collectively handle a family of cyber threats and may include security products, such as, for example, an IDS, an anti-virus, anti-malware, a web application firewall (WAF), a network behavior analysis, a combination thereof, and the like. The security products 150 may be provided by the same or different vendors.

During runtime, each security product 150 generates attack logs (or events) identifying activity (malicious or non-malicious) detected in the network 110. An attack log is typically in a structured format that may vary from product to product. For example, a single log (e.g., file) may contain identified hosts, users, a network address and the type of activity (e.g., event) detected by one of the security products 150. The attack logs are generated and input to the cybersecurity system 100 at runtime, i.e., when a security product 150 is active in detecting, investigating, or mitigating an on-going attack, or a combination thereof.

The cybersecurity system 100 is configured to orchestrate the operation of the various security products 150. In particular, according to the disclosed embodiments, the cyber-security system 100 can configure or cause one or more of the security products 150 to proactively mitigate an attack that may or may not be detected by such security products. The security products 150 are typically deployed and provided by third-party vendors, and are typically designed to protect against different cyber-threats.

The proactive mitigation implemented by the cybersecurity system 100 includes the processing of security events. Such events are generated in response to attack logs received from the security products 150. It should be noted that attack logs or any data reported by security products 150 may be presented or formatted as events. Attack logs are generated in response to detecting at least behavior, activity, and the like that indicate a potential attack or the usage of any monitored protected object in the network.

In an embodiment, all events generated by the security products 150 (hereinafter "seed events" or a "seed event") are normalized into a unified format. In such a unified format, a seed event 'E' may include one or more of the following attributes: E(src) indicating a source of the event E; E(dst) indicating the destination of the event E; E(performer) indicating a normalized event sourced (the attack's originator identity); E(victim) indicating a normalized event destined to (the attack's victim identity); E(tt) indicating a threat type; E(sde) indicating a security decision engine; E(ap) indicating an application path, that is the protocol, application, URL, used to attack the victim; E(cert) indicating a certainty of a proactive event; E(risk) indicating a risk level of the attack associated with the event E; E(attack) indicating an attack associated with the event; and E(C&E) indicating the cause-and-effect counter associated with E(performer).

According to the disclosed embodiments, the cybersecurity system 100 is configured to proactively mitigate multi-vector attack campaigns. A multi-vector attack campaign can be detected or identified. Such a campaign may include, but not limited to, an insider threat campaign, a personal data-leak campaign, a ransomware campaign, an intelligence gathering, a financial data-leak campaign, a denial-of-service (DoS) distributed DoS (DDoS), and so on.

The cybersecurity system 100 is configured to correlate proactive events using a pattern correlation process, to compute a prediction score based on the correlation. Based on the prediction score and a security policy, the cybersecurity system 100 is configured to determine if any mitigation actions should be performed. The prediction score is an indication regarding the probability that the proactive event will be later used to perform new attacks or to expand an existing attack.

It should be noted that mitigation actions may impact the operation of part of the organization (e.g., disabling certain services, networks, and/or services). Thus, to minimize the negative effect of any mitigation actions, the security policy is considered. The security policy may define a set of application paths and hosts that should or should not be mitigation in different prediction scores.

The pattern correlation process is configured to detect different types of correlations including, but not limited to, a common ancestor, an overlap-cause, and a common descendant. The disclosed method is designed such that that new types of pattern correlation can be easily added or removed, and the correlation score of the pattern can be changed. In an embodiment, the pattern correlation is based on a basic cause-effect correlation between matched events.

A matched event is a seed event that was matched to at least one workflow rule. A workflow rule defines a sequence of activating, deactivating, and correlating the various functions and modules of the cyber-security system 100. In an embodiment, one or more workflow rules are defined for each different type of cyber-security threat.

An advanced event is a matched event associated with an ongoing advanced attack, and/or an event that is associated with a host that is compromised based on an indication of compromise (IOC). An advanced attack may be any cyber-attack that successfully detected and actively mitigated the cybersecurity system 100. An advanced attack may also be associated with an attack that has reached a high-risk level, in parallel to hosts with detected indications of compromise, and/or with a predefined number of threats in cause-and-effect relationships. In sum, an advanced attack may be an attack identified as a real threat and not a false positive. In another embodiment, the advanced attack is an attack classified as such and imported from an external attack database. The proactive mitigation techniques disclosed herein may be utilized to prevent an advanced attack from being expanded or propagated to other hosts, or to prevent the attack's goals (i.e., prevent the final consequences), or to prevent new or premature attacks.

A potential threat is an object determined by the cyber-security system 100 to have similar attributes to a matched event. That is, the object is a prediction of malicious activity that can be performed by the attacker as part of a cyber-attack. Mitigating this potential threat in advance, will reduce the capability of the attacker to perform the attack. The potential threat is determined based on the correlation to advanced events.

A cause-effect relationship between two events (marked as $E_1 \rightarrow E_2$) demonstrates the connection between two seed events, in which the first event ($E_1$) is the cause and the second event ($E_2$) the effect. Example embodiments for determining cause-and-effect relationships between events can be found in co-pending U.S. patent application Ser. No. 15/239,258 (hereinafter the '258 Application) to Chesla, assigned to the common assignee, which is hereby incorporated by reference for all that it contains. Each of the different types of events may be in a normalized formant and includes the attributes mentioned above.

The correlation score is a function of the detected correlation types and a number of correlations identified for a predicated event. An exemplary implementation of the cybersecurity system 100 is discussed in greater detail with respect to FIGS. 9 and 10.

Figure 2:
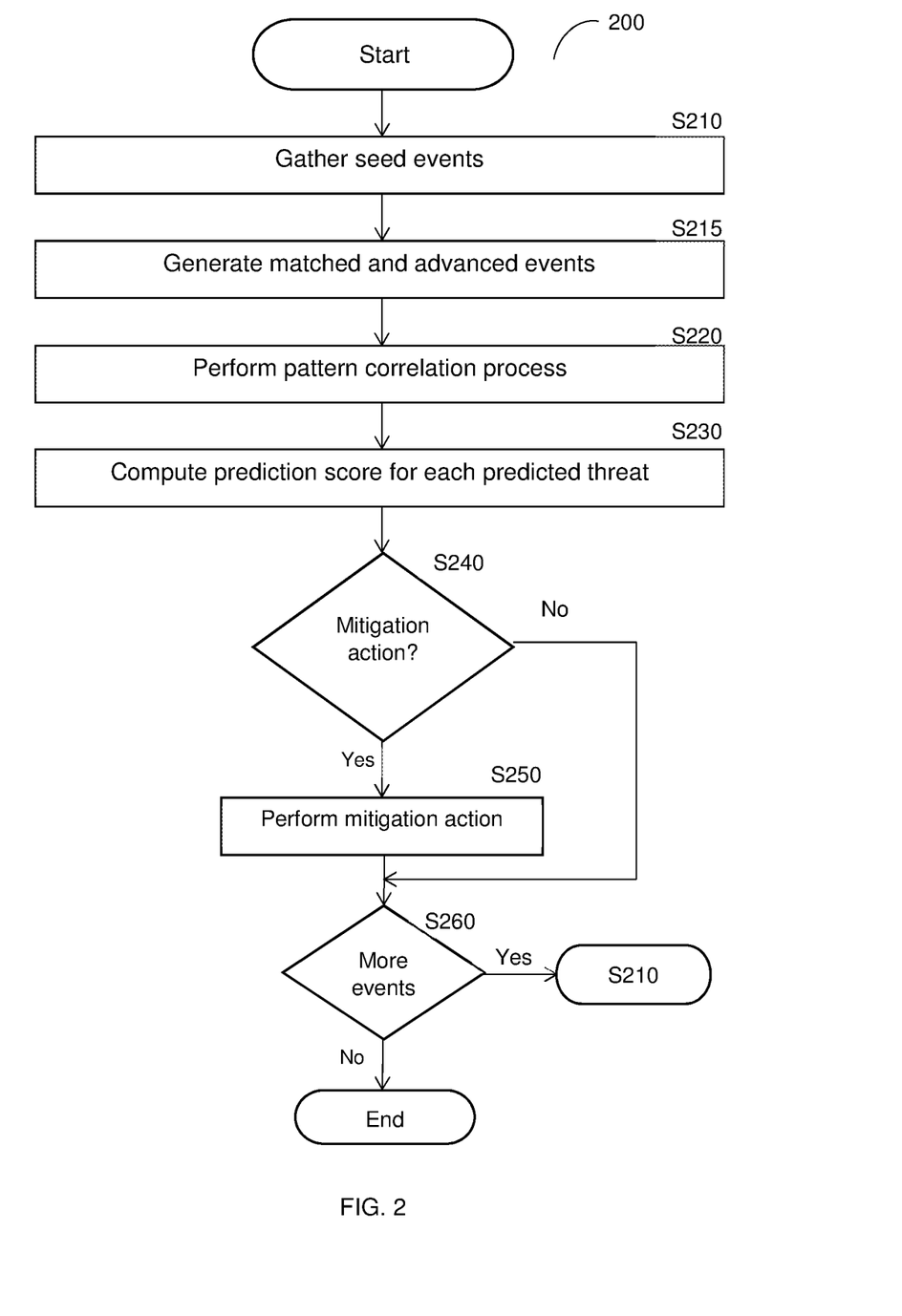
FIG. 2 is a flowchart depicting a method for proactive mitigation of cyber threats according to an embodiment.

FIG. 2 shows an example flowchart 200 illustrating a method for performing proactive mitigation against cyber-threats according to an embodiment. At S210, seed events are gathered or otherwise generated based on attack logs received from a plurality of security products. In an embodiment, S210 includes normalizing the attack logs to be presented in a unified format. An example unified format is provided above. It should be noted that seed events are generated in response to detection of at least one of behavior, activity, and the like that indicate a potential attack.

At S215, matched events and advanced events are generated. To this end, the seed events are matched against at least one workflow rule. All seed events matching the workflow rule(s) are marked as matched events. All matched events that are associated with an advanced attack (or an identified threat) are marked to as advance events. For example, if a host-A is under attack and is classified as an advanced attack, and a matched event includes the attribute E(to)=host-A, then such an event is marked as an advanced event. Additional examples are provided below. The association of matched events with advanced attacks may be performed using the risk-chain mechanism discussed in the above-referenced '258 Application. The various generated and received events may be saved in a database or any type of storage.

At S220, a pattern correlation process is performed. The pattern correlation process includes classifying of potential threats to a set of correlation types. Each correlation type reflects a similarity between advanced attacks with matched events and advanced events. That is, a correlation type determines how a potential threat may correlate to at least advanced attacks. A correlation score is determined, based on the correlation type, for each potential threat that is correlated to one or more advanced attacks. The correlation types include, but are not limited to, common ancestor, overlap cause, overlap cause chain, overlap cause-effect, and common descendant.

In another embodiment, the correlation score is a function of a prediction's probability and a confidence level. In an embodiment, the confidence level is higher if the correlation can be tracked back to the seed security events and lower when the correlation detected only at threat type (demonstrated below). The confidence level may be a function of the number of correlated events detected in the pattern. That is, the higher the number of correlated events, the higher the confidence level is. The probability of the prediction may be based on statistics on the number of advanced attacks with the same pattern. In this case, the prediction score is a function of the probability, the confidence, and a risk level.

In an embodiment, S220 may result in a list of potential threats and the correlation scores based on the correlation of the received seed events. A detailed discussion of S220 is provided in FIG. 3 described herein below.

At S230, a prediction score is determined for each potential threat. In an embodiment, the prediction score is a function of the correlation score, a threat type, and an attack risk level. In some embodiments, cause-and-effect attributes are also considered. Such attributes include, for example, a host cause-effect counter (both the attack risk level and the host cause and-effect counter are used to define the weighted risk level). The attack risk level is of an advanced attack correlated to the potential threat.

In an embodiment, the attack risk level is based on at least one of: a transition from global threat type to another threat type, an attack type, network relationships, and the like. The attack risk level may be set to a low, high, or medium level. Alternatively, the attack risk level may be a numerical value (e.g., an integer number from 0-9). The risk level may be determined using the risk-chain mechanism discussed in the above-referenced '258 Application.

A global threat type defines a certain type of malicious activity and may include, for example, an action (data leak), a command-and-control, a propagation, a probe, and a social engineering. The threat type is associated with each potential matched event using matching rules. In an embodiment, the mapping is based on a threat characteristic. For example, events that represent an action will be mapped into an action global threat type. Such events can result from activity related to data-exfiltration patterns, drop zone activity behavior, or DoS.

In an example embodiment, the prediction score is a numerical value (e.g., an integer number from 0-5). For example, a higher score (e.g., 5) results in a high correlation score and high attack risk level. A lower score (e.g., 1) results in a low correlation score and low attack risk level. That is, in an embodiment, there is a direct relationship between the correlation score, the attack risk level, and the prediction scores. In some embodiments, when the potential threats are correlated to two or more advanced attacks, the highest risk level associated with such attacks is considered for the prediction score.

At S240 it is determined if a mitigation action should be executed against the advanced attack correlated to the potential threat. If so, execution continues with S250; otherwise, execution proceeds with S260. In an embodiment, the determination at S240 is based on a security policy and the prediction score. In an embodiment, the security policy includes a plurality of policy rules. Each policy rule is defined using a prediction score threshold and any one of: priority, source, destination, and/or protocol. Thus, if the predicated threats event matches a policy rule, a mitigation action is executed.

In an embodiment, S240 includes comparing the prediction score to a predefined threshold, wherein the mitigation action is performed at S250 when the score exceeds the threshold. In yet another embodiment, the mitigation action may be based on the cost of mitigation. Such a cost may be the communication resources required to allocate for the mitigation and/or monetary costs. The monetary costs may be, for example, determined based on monetary loss due to lack of mitigation or unnecessary mitigation (e.g., cost associated with mitigating legitimate business transactions).

At S250, a mitigation action is performed in order to block the propagation of the advanced attack associated with the potential threat.

A mitigation action may include blocking network traffic between a set of sources and a set of destinations, diverting network traffic, generating alerts, or any combination thereof. The mitigation action may include instructing an end-point security device to perform the action, e.g., activating the host based firewall to block communication, and so on. The source and destination may be designated by a host name, an IP address, a user name, or a group of IP addresses (e.g. subnet or any logical set of hosts/addresses). The network traffic may include all the traffic or specific part of the traffic identified by the port numbers, protocols, applications, URL, or any combination thereof, and the like. The protocol may be any Layer 4 (L4) or Layer 7 (L7) protocol.

At S260 it is checked if there are new or additional seed events to process and, if so, execution returns to S210; otherwise, execution terminates.

Figure 3:
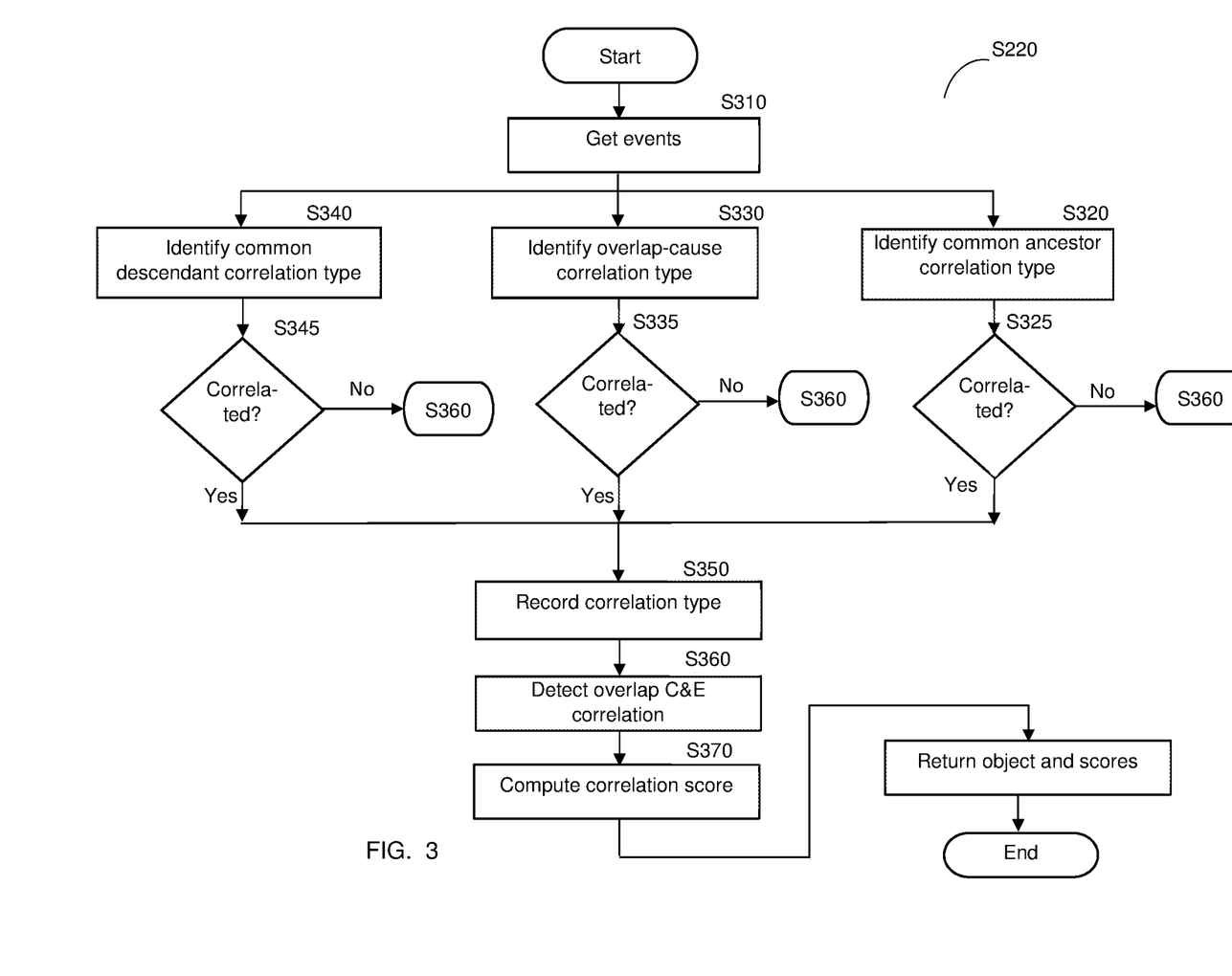
FIG. 3 is a flowchart depicting a pattern correlation process according to an embodiment

FIG. 3 shows an example flowchart S220 illustrating the pattern correlation process according to an embodiment. At S310, seed, matched, and advanced events are retrieved. The generation of these events is discussed above. The events may be retrieved from, for example, a database or any storage device.

At S320, the retrieved events are processed to identity a common ancestor correlation type. Specifically, for this correlation type, it is determined if an advanced event and a potential threat have the same ancestor (source). That is, an advanced event (E) and a potential threat (T) should have the same (from) attribute value (i.e., T(from)=E(from)).

Figure 4:
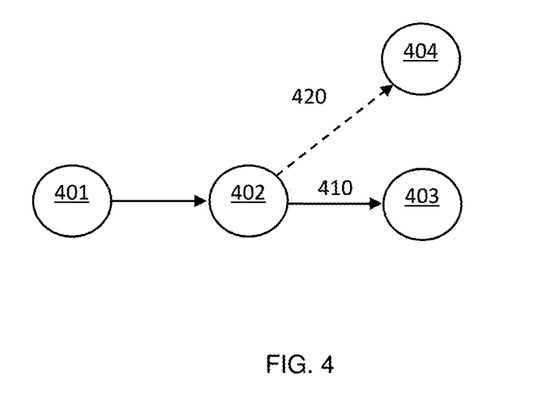
FIG. 4 is a diagram demonstrating a common ancestor correlation type.

This type of correlation is further demonstrated in the FIG. 4. An advanced attack shows a compromise communication channel between a host 401 and a host 402, and from the host 402 to a host 403. The communication between the hosts 402 and 403 is shown by the advanced event (410). To expand the attack (e.g., a data leak), the host 402 would try to infect other hosts (e.g., a host 404). Thus, a potential threat (420) is determined if the host 402 will try to expand the attack to 404 using a similar communication channel. The (from) attribute values of both the event (410) and threat (420) is the same.

That is, when the advanced event E is associated with an advanced attack, the channel between the hosts 402 and 403 is compromised (e.g., data leak activity). Thus, the common ancestor correlation type indicates that the communication channel between the hosts 402 and 404 may also be compromised.

At S325, it is checked if a common ancestor correlation type has been identified and, if so, execution continues with S350 where the identified correlation type is recorded; otherwise, execution continues with S360.

At S330, the retrieved events are processed to identity an overlap-cause correlation type. That overall cause may be based on an event or a chain of events. The basic overlap-cause correlation type is an-event based correlation. Specifically, for this correlation type, it is determined when at least one advanced event in a chain (i.e., of two or more advanced events) overlaps a matched event. If so, the matched event may be part of a premature attack that is similar to the advanced attack associated with the correlated advanced event. In this case, the potential threat is an object that overlaps the second event in the chain of the advanced events. This type of correlation aims to mitigate premature attacks in advance, based on existing advanced attacks.

For example, for a chain of advanced events $E_1$, $E_2$ such that $E_1 \rightarrow E_2$ and $E_1(to)=E_2$ (from) are associated with an advanced attack. When a matched event E' correlates to or overlaps with $E_1$, then E' may be part of an extended attack. Thus, the potential threat (T) overlaps with $E_2$ and T(from) is the same E'(to).

In an embodiment, two events (or an event and a threat) are considered as overlapped when their application paths (E(ap)) are the same. In another embodiment, if the two events are generated by the same decision engine (discussed below), they are also considered as overlapped.

Figure 5:
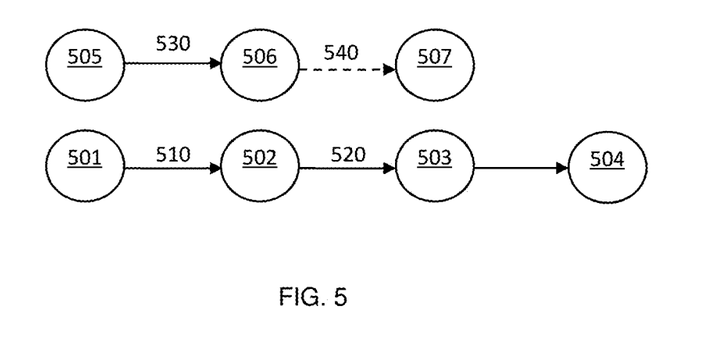
FIG. 5 is a diagram demonstrating an event overlap-cause correlation type.

This type of correlation is further demonstrated in FIG. 5. An advanced attack shows a communication between host 501 to a host 502 (as an event 510), and from host 502 to host 503 (as an event 520). In the scenario shown in FIG. 5, there is a matched event 530 from host 505 to host 506 that overlaps with the event 510. The determined potential threat 540 from the host 506 to host 507 should overlap with the event 520.

The overlap-cause chain correlation type is an extended version of the overlap cause event scenario. That is, in this type of correlation, there are a plurality of matched events in a chain that overlap two or more advanced events. This indicates that the correlation of the potential threats is higher.

At S335, it is checked if an overlap-cause correlation type has been identified and, if so, execution continues with S350 where the identified correlation type is recorded; otherwise, execution continues with S370.

At S340, the retrieved events are processed to identity a common descendent correlation type. Specifically, this correlation type is determined when an advanced event and a potential threat have the same descendent (destination). That is, an advanced event (E) and a potential threat (T) should have the same attribute value (to), hence T(to)=E(to).

Figure 7:
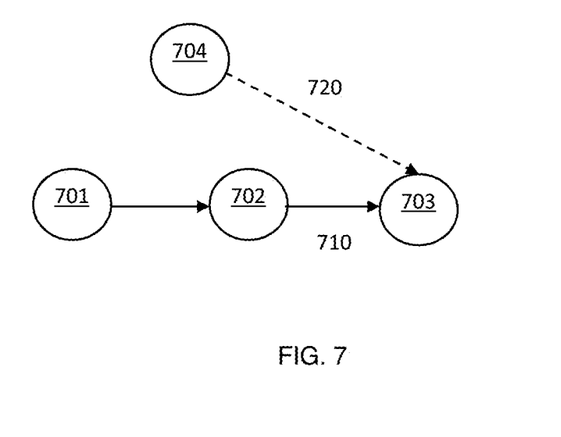
FIG. 7 is a diagram demonstrating a common descendant.

This type of correlation is further demonstrated in FIG. 7. An advanced attack shows a communication between host 701 to a host 702, and from host 702 to a host 703. The communication between the hosts 702 and 703 is captured through an advanced event (710). The host 703 may be infected by other hosts (e.g., a host 704). Thus, a potential threat (720) is determined based on a potential communication between the hosts 704 and 703, where the host 704 is the source of the attack on the host 703. The (to) attribute values of both the event (710) and the threat (720) is the same.

At S345, it is checked if a common descendent correlation type has been identified. If so, execution continues with S350 where the identified correlation type is recorded; otherwise, execution continues with S370.

In an embodiment, at S360, all detected correlation types (those resulted from S320 and S330) are further analyzed to determine if such correlations demonstrate an overlap cause-effect (C&E) correlation type. This type of correlation is determined when a cause-effect matched event overlaps a cause-effect advanced event. In this correlation type, two events are considered as overlapping when their E(from) attribute value is the same. In this case, the potential threat leads to the same host victimized by the cause-effect matched event.

Figure 6:
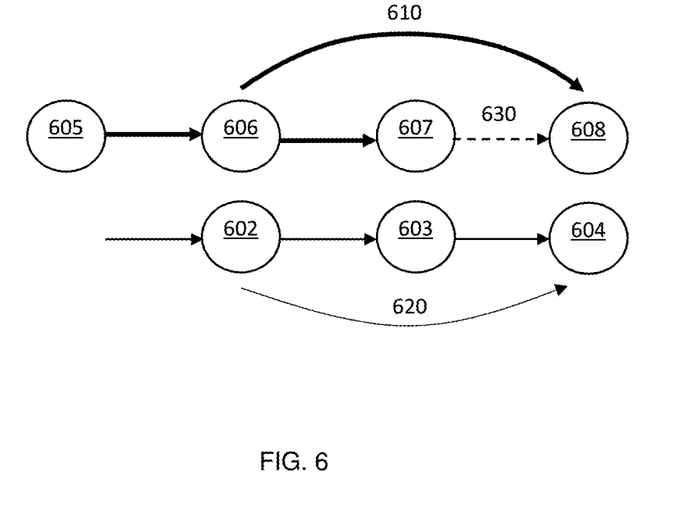
FIG. 6 is a diagram demonstrating an overlap-cause-effect correlation type.

The overlap cause-effect correlation type is further demonstrated in FIG. 6. The event 610 is a cause-effect matched event between hosts 606 and 608. The event 620 is a cause-effect advanced event between hosts 602 and 604. Events 610 and 620 are overlapped. The potential threat 630 is between hosts 607 and 608.

The cause-effect correlation type serves as a complementary correlation to the overlap and common ancestor correlation types. Thus, detection of such a correlation type would increase the confidentially between matched events and advanced events are correlated and the correlation score.

It should be noted that the number of correlated/overlapped events to the advanced events increases the correlation strength. Thus, the number of such events is maintained when determining the various correlation types discussed above. It should be further noted that the S320, S330, S340 can be performed in parallel or using a different order without departing from the scope of the disclosure. It should be further noted that multiple different or same correlation types may be associated with a single potential threat.

At S370, a correlation score is computed for each identified potential threat. The correlation scores are based on the type of correlation with the potential threat and the number of correlated events for the potential threat. In an example embodiment, the correlation score is a numerical value from 1-10. For example, the correlation score of a potential threat correlated with one advanced event according to the common ancestor correlation type may be 6, and the correlation score of a potential threat correlated with two or more correlated advanced events according to the common ancestor correlation type may be 8. In an example embodiment, the correlation types that would result in the highest score are the common ancestor and the overlap-cause-chain.

In certain embodiments, if two different correlation types resulted with the same potential threat, then the correlation score is high. For example, if a common ancestor and an overlap cause-effect are both identified for the same threat, the correlation score is 8 (on a scale of 1-10). If in addition, the potential threat correlated with two or more correlated advanced events, the correlation score is increased to 10.

In another embodiment, the correlation score is a function of a prediction's probability and a confidence level. In an example embodiment, the confidence level is higher if the correlation can be tracked back to the seed security events and lower when the correlation detected only at threat type (demonstrated below). The confidence level may be a function of the number of correlated events detected in the pattern. That is, the higher the number of correlated events, the higher the confidence level is. The probability of the prediction may be based on statistics on the number of advanced attacks with the same pattern. In this case, the prediction score is a function of the probability, the confidence, as well as a risk level.

At S370, for each potential threat, its object (i.e., attributes) and correlation scores are returned.

It should be noted that the hosts depicted in FIGS. 4-7 can be identified by a host name, an IP address, a user name, a group of IP addresses, a port number, and the like.

Figure 8:
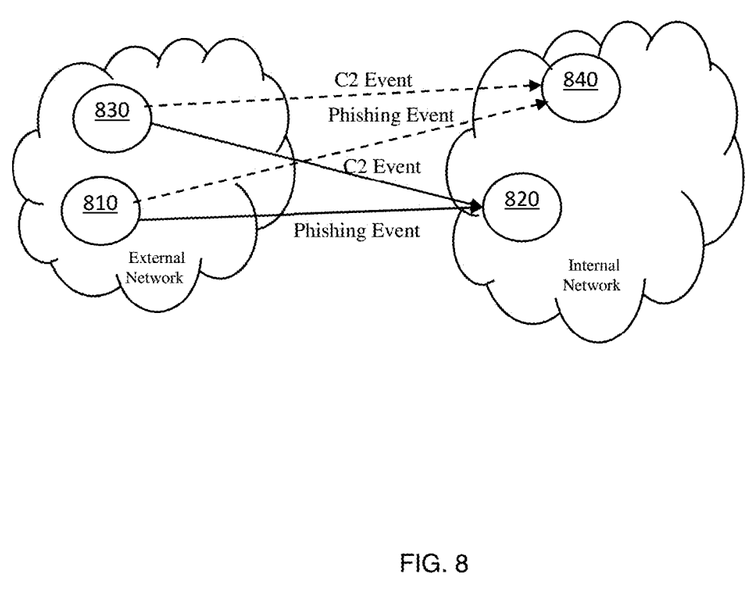
FIG. 8 is a diagram illustrating the proactive mitigation of ransomware cyber-attack.

FIG. 8 shows an example for the operation of the prediction mitigation method. In the example shown in FIG. 8, the disclosed method is utilized to prevent the infection of hosts with ransomware malware. As shown in FIG. 8, an attack tool (host 810) infects a host 820 with ransomware malware. The host 820 is an internal host being protected by a cybersecurity system (e.g., the cybersecurity system 100, not shown). The attacker uses another host 830 to control the infected host 820 through a command-and-control (C2) channel. For example, the host 830 can lock the host 820 by contorting the ransomware over the C2 channel.

The attack against the host 820 is detected by the cybersecurity system (not shown in FIG. 8), based on the phishing and the C2 events. As such, the attack is classified as an advanced attack and entered to the mitigation phase. The threat types associated with this attacks are C2 and social engineering. Further, the attack risk level is set to high. An example mitigation action would be to block the communication channels between the host 820 and the attacker hosts 810 and 830.

Since the attack is in a mitigation phase (i.e., defined as an advanced attack), a correlation is identified between advanced events associated with the attack and potential threats. Thus, all the potential threats between the attacker hosts 810 and 830 with all other internal hosts (i.e., the host 840), are correlated as a common ancestor correlation type. The attack risk level is high and the threat types are C2 and social engineering. Thus, based on, for example, a scoring table, the prediction score is 4 (on a scale of 1-5). Based on a security policy, the communication channels between hosts 810 and 840 as well as between hosts 810 and 830 are blocked.

Figure 9:
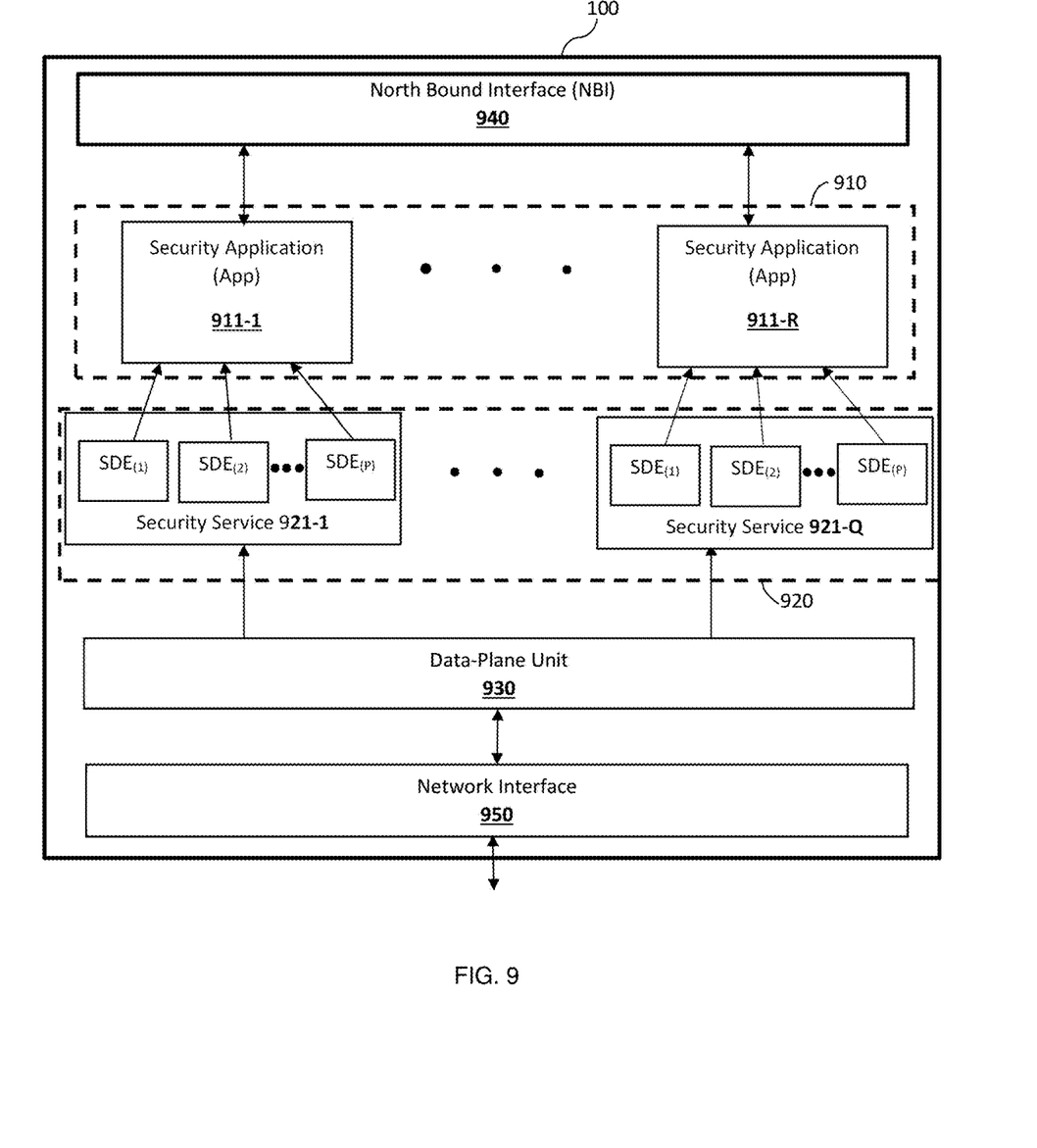
FIG. 9 is a block diagram of the cybersecurity system implemented according to an embodiment.

FIG. 9 shows an example block diagram of the cybersecurity system 100 implemented according to one embodiment. In an example implementation, the cybersecurity system 100 includes the following units: a security application unit 910, a security services unit 920, a data-plane unit 930, a northbound interface (NBI) 940, and a network interface 950.

The security services unit 920 hosts a plurality of security services 921-1 through 921-Q (hereinafter referred to individually as a security service 921 and collectively as security services 921, merely for simplicity purposes) being reusable across different security applications 911-1 through 911-R (hereinafter referred to individually as a security application 911 and collectively as security applications 911, merely for simplicity purposes) of the security application unit 910. Thus, different security applications 911 (each one for a different purpose) can utilize the same or different security services 921 for their respective needs.

The security application unit 910 includes the security applications (apps) 911. Each security application 911 represents a different type of security protection or function. For example, a security application 911 can be configured to handle an insider threat campaign, a personal data-leak campaign, a ransomware campaign, an intelligence gathering, a financial data-leak campaign, or a denial-of-service (DoS) attack campaign, and so on. Each security application 911 can be updated according to evolving security needs. Updating the security application 911 may include, but is not limited to, reconfiguring the security application 911. In an embodiment, the security applications unit 910 is preconfigured with a set of security applications 911. Additional security applications 911 can be added or removed from the security application unit 910 in real-time as needed.

In an embodiment, a security service 921 represents a cyber-solution category. A security service 921 can execute a plurality of logical security functions defined to handle a specific cyber-solution category. Each such category typically utilizes different types of security technologies and thus supports different types of attack detection, investigation, attack mitigation rules, or a combination thereof.

Examples of security services 921 that can be maintained and executed by the security services unit 920 include a network behavior anomaly (NBA) security service, an anti-malware (e.g., sandbox) security service, a reputation security service, an IDS security service, a challenge-response security service, an anti-virus (AV) security service, and a Web application firewall (WAF) security service. Examples for the functionality of the security services 921 can be found in co-pending U.S. patent application Ser. No. 14/615,020 (hereinafter the '020 Application) to Chesla, assigned to the common assignee, which is hereby incorporated by reference for all that it contains.

Each security service 921 includes one or more security decision engines $SDE_{(1)}$ through $SDE_{(P)}$. The SDEs may programmable or preconfigured. A security service 921 is configured to use a set of pre-defined SDEs, to import SDEs, to create a new security decision engine and shares, or a combination thereof. A SDE represents a logical threat protection category within the security service. The creation and modification of such SDEs can be performed via a programming language, via threats classification processes designed to automatically populate an SDE with security rules (e.g., IDS attack signature rules) per threat, and so on. The SDEs, and therefore the security services 921, can allow the cybersecurity system 100 to adapt to new threats, new attack behaviors, unknown behaviors, or attacks that utilize new evasion techniques.

A security service 921 is configured to generate a plurality of signals based on its various SDEs. Such signals are generated in response to detecting at least behavior, activity, and the like that indicate a potential attack or the usage any monitored protected object in the network. In order to generate signals, each SDE is configured to receive and process attack logs from the security products (e.g., the security products 150, FIG. 1). Such information is received at the security services 911 through the data-plane unit 930 and the north bound interface 940. The signals generated by the SDEs of a security service are processed by each security application 911 to generate the seed, matched, and advanced events.

To this end, each security application 911 is configured to interface with the security services 921 to collect or otherwise receive signals. Signals are correlated into seed events using a set of event rules. Event rules can be applied to a signal's value, a duration, a frequency, and so on, or any combination thereof. The generation of seed events in response to signals are discussed in greater detail in the above-referenced '020 Application. Seed events can be normalized to a unified format. The seed events can be further correlated using one or more correlation rules to produce matched and advanced events as discussed above.

In an embodiment, a security application 911 can perform an automatic threat prediction and to execute a proactive mitigation action. To this end, the application 911 determines the correlation types of the various event to detect potential threats. Each potential threat is proactively mitigated based on the prediction score and a security policy.

In another embodiment, each security application 911 is configured to generate risk-chains. A risk-chain is a lifecycle of a cyber-attack. A risk-chain can be utilized to determine the source, destination, current malicious activity, and future malicious activity, thereby enabling detection, investigation, and mitigation of the attack by applying automated decisions taken with respect to the risk-chains. In addition, for each generated risk-chain, a security application 911 is configured to compute or determine an attack risk level for the risk-chain. Then, a security application 911 is configured to process the seed events using a set risk-chain generation (RCG) rules. The RCG rules may be specific for each application 911, for each specific tenant (protected object) protected by an application 911, for each attack-type, for a combination thereof, and so on. The set of RCG rules includes grouping rules, mapping rules, and matching rules applied on the received events. The generation of risk-chains is discussed in further detail in the above-referenced '258 Application.

The data-plane unit 930 provides central control of the data-plane resources, such as routers, switches, middle-box L4-L7 and security devices, and so on. In an embodiment, the data plane unit 930 is configured to allow the security services 921 to retrieve and store the required network and application information from such data plane resources as well as to enforce security network control actions.

The data-plane unit 930 can perform networking functions such as topology discovery, traffic monitoring (copy services), traffic redirection functions, traffic distribution (L2, L3 load balancing for scaling out resources), management of quality of service (QoS) actions in the network elements, and the like. In some example implementations, certain functions provided by the data-plane unit 930 can be implemented in the central SDN controller 140. Examples for such functions may include, but are not limited to, redirection, copy, QoS, and data collection.

The north bound interface 940 is configured to interface between the security system 100 and one or more external systems or elements (not shown). The external systems may include, for example, third party security analytics systems, security portals, datacenter orchestration systems, identity management systems (e.g., domain controllers, DNS, DHCP, etc.), or any other system or element that can provide information to the security system 100. This enables a wider context-based security decision making process.

The north bound interface 940 may include standard interfaces, such as CLI, REST APIs, Web user interface, as well as drivers that are already programmed for control, configuration, monitoring, or a combination thereof of specific third party systems, and so on.

The various units are communicatively interconnected through a predefined set of interfaces APIs, or both. As a result, the cybersecurity system 100 is fully programmable and configurable. The interfaces and APIs may be designed to be unidirectional, bidirectional, or one-to-many bi-directional flows of information.

It should be noted that modules in the cybersecurity system 100 and the units 910, 920, and 930 are independent. Thus, any changes in one unit or module do not necessarily result in any changes to the other modules.

The network interface 950 provides an interface layer of the cybersecurity system 100. Such communication can be with SDN-based network elements or "legacy" network elements (not shown) in the network (e.g., network 110, FIG. 1).

The network interface 950 supports bidirectional communication drivers to allow communication with the data-plane elements including configurations, policy reading, and logs collection. The drivers support different forms of communication standards and vendors' defined interfaces such as, but not limited to, Netconf, Netflow, BGP, BGP flow spec, SSH, CLIs, DB APIs and more. The drivers enable communication with middle-box devices (e.g., L4-L7 devices and security devices, DPI devices, etc.), end point devices (mobile, host based security applications), server applications, management systems of these devices, combinations thereof, and so on. The network interface 950 also interfaces with the plurality of security products 150 designed to protect against different cyber threats.

Each, some, or all of the modules of the cybersecurity system 100 may be realized by a processing circuitry or system. The processing circuitry may comprise or be a component of a larger processing circuitry implemented with one or more processors. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that can perform calculations or other manipulations of information.

The processing circuitry may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 10:
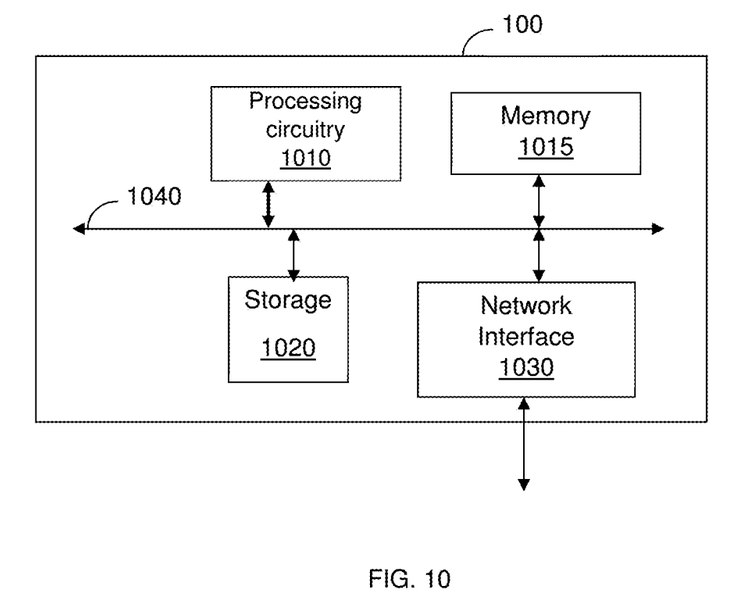
FIG. 10 is a block diagram of the cybersecurity system implemented according to another embodiment.

FIG. 10 shows an example block diagram of the cybersecurity system 100 according to another embodiment. The cybersecurity system 100 includes a processing circuitry 1010, a memory 1015, a storage 1020, and a network interface 1030, all connected to a computer bus 1040.

The processing circuitry 1010 may be realized by one or more hardware logic components and circuits. Examples for such hardware logic components and circuits are provided above. The memory 1015 may be volatile, non-volatile, or a combination thereof. The storage 1020 may be magnetic storage, optical storage, and the like.

In one configuration, computer readable instructions to implement one or more embodiments disclosed herein may be stored in the storage 1020. The storage 1020 may also store other computer readable instructions to implement an operating system, an application program, and the like. Computer readable instructions may be loaded in the memory for execution by the processing circuitry 1010. The computer readable instructions, when executed, causes the processing circuitry 1010 to perform the process for proactive mitigation of predicated threats and cyber-attacks as discussed in detail herein above.

In another embodiment, the storage 1020, the memory 1015, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 1010 to perform the various functions described herein with respect to at least detection of vulnerable wireless networks.

According to some embodiments, the storage 1020 may be utilized to store at least attributes associated with each of seed events, matched events, advanced events, and potential threats.

The network interface 1030 may include a wired connection or a wireless connection. The network interface 1030 may be utilized to transmit communications media, to receive communications media, or both. In an embodiment, the network interface 1030 provides an interface layer of the cybersecurity system 100. Such communication can be with SDN-based network elements or "legacy" network elements (not shown) in the network 110.

The network interface 1030 supports bidirectional communication drivers to allow communication with the data-plane elements including configurations, policy reading, and logs collection. The drivers support different forms of communication standards and vendors' defined interfaces such as, but not limited to, Netconf, Netflow, BGP, BGP flow spec, SSH, CLIs, DB APIs and more. The drivers enable communication with middle-box devices (e.g., L4-L7 devices and security devices, DPI devices, etc.), end point devices (mobile, host based security applications), server applications, management systems of these devices, combinations thereof, and so on. The network interface 1030 also interfaces with the plurality of security products designed to protect against different cyber threats. The computer bus 1040 may be, for example, a PCIe bus.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for proactively predicting cyber-security threats, comprising:

receiving a plurality of security events classified to different groups of events;

processing the plurality of received security events in order to classify potential cyber-security threats into a set of correlation types;

determining a correlation score for each of the classified potential cyber-security threats by factoring at a correlation confidence level, a risk level of an identified threat, and a probability of the prediction; and determining a prediction score for each of the classified potential cyber-security threats, wherein the prediction score is determined based in part on the correlation score.

2. The method of claim 1, further comprising:

performing a mitigation action against the potential cyber-security threat, wherein the mitigation action is determined based on the prediction score and a security policy.

3. The method of claim 2, wherein the mitigation action includes at least one of: blocking network traffic between at least one source and at least one destination, diverting network traffic, and generating alerts.

4. The method of claim 2, further comprising: determining the mitigation action based on a cost for performing the mitigation.

5. The method of claim 1, wherein a group of security events is any one of: a matched event and an advanced event, wherein the matched event is a security event matching at least one workflow rule, and wherein the advanced event is a matched event associated with an advanced attack caused by an identified cyber-security threat.

6. The method of claim 5, wherein each of the set of correlation types is any one of: a common ancestor correlation type, an overlap cause correlation type, an overlap cause-effect correlation type, and a common descendant correlation type.

7. The method of claim 5, wherein each of the set of correlation types determines how a potential cyber-security threat correlates to at least advanced events.

8. The method of claim 7, wherein the common ancestor correlation type is determined when at least one advanced event is originated from a same ancestor source as a potential cyber-security threat.

9. The method of claim 7, wherein the overlap cause correlation type is determined when at least one advanced event in a chain of advanced events overlaps at least one matched event, wherein the potential cyber-security threat is a premature threat of an advanced attack.

10. The method of claim 9, wherein events are considered overlapped when at least one of: application paths' attributes and seed events' attributes are the same.

11. The method of claim 7, wherein the common descendant correlation type is determined when at least one advanced event is destined to a same destination as a potential cyber-security threat.

12. The method of claim 11, wherein any one of the common ancestor correlation type and the overlap cause correlation type is determined when a cause-effect matched event overlaps a cause-effect advanced event, wherein a potential cyber-security threat leads to a destination designated in the cause-effect matched event.

13. The method of claim 12, wherein the two events are considered overlapping when said two events originate from the same source.

14. The method of claim 1, wherein determining the correlation score further comprises:

factoring at least one of: a number of correlated events and a number of identified correlation types.

15. The method of claim 14, wherein determining the prediction score further comprises:
    factoring in addition to the correlation score at least one of: a type of an identified potential cyber-security threat, a risk level associated with the identified potential cyber-security threat, and at least one cause-and-effect attribute.

16. The method of claim 1, wherein each potential cyber-security attack is at least a multi-vector attack campaign.

17. The method of claim 1, wherein the multi-vector attack campaign is any one of: an insider threat campaign, a personal data-leak campaign, a ransomware campaign, an intelligence gathering, a financial data-leak campaign, and a denial-of-service (DoS) attack campaign.

18. A non-transitory computer readable medium having stored thereon instructions for causing a processing circuitry to execute a process for proactively predicting cyber-security threats, the process comprising:
    receiving a plurality of security events classified to different groups of events;
    processing the plurality of received security events in order to classify potential cyber-security threats into a set of correlation types;
    determining a correlation score for each classified potential cyber-security threats by factoring at a correlation confidence level, a risk level of an identified threat, and a probability of the prediction; and
    determining a prediction score for each classified potential cyber-security threat, wherein the prediction score is determined based in part on the correlation score.

19. A cyber-security system for proactively predicting cyber-security threats, comprising:
    a processing circuitry; and
    a memory, the memory containing instructions that, when executed by the processing circuitry, configure the system to:
    receive a plurality of security events classified to different groups of events;
    process the plurality of received security events in order to classify potential cyber-security threats into a set of correlation types;
    determine a correlation score for each of the classified potential cyber-security threats by factoring at a correlation confidence level, a risk level of an identified threat, and a probability of the prediction; and
    determine a prediction score for each classified potential cyber-security threat, wherein the prediction score is determined based in part on the correlation score.

20. The system of claim 19, wherein the system is further configured:
    perform a mitigation action against the potential cyber-security threat, wherein the mitigation action is determined based on the prediction score and a security policy.

21. The system of claim 20, wherein the mitigation action includes at least one of: blocking network traffic between at least one source and at least one destination, diverting network traffic, and generating alerts.

22. The system of claim 20, further comprising: determining the mitigation action based on a cost for performing the mitigation.

23. The system of claim 19, wherein a group of security events is any one of: a matched event and an advanced event, wherein a matched event is a security event matching at least one workflow rule, and wherein an advanced event is a matched event associated with an advanced attack caused by an identified cyber-security threat.

24. The system of claim 23, wherein each of the set of correlation types determines how a potential cyber-security threat correlates to at least advanced events.

25. The system of claim 24, wherein the overlap cause correlation type is determined when at least one advanced event in a chain of advanced events overlaps at least one matched event, wherein the potential cyber-security threat is a premature threat of an advanced attack.

26. The system of claim 25, wherein events are considered overlapped when at least one of: application paths' attributes and seed events' attributes are the same.

27. The system of claim 24, wherein the common descendant correlation type is determined when at least one advanced event is destined to a same destination as a potential cyber-security threat.

28. The system of claim 27, wherein any one of the common ancestor correlation type and the overlap cause correlation type is determined when a cause-effect matched event overlaps a cause-effect advanced event, wherein a potential cyber-security threat leads to a destination designated in the cause-effect matched event.

29. The system of claim 28, wherein the two events are considered overlapping when said two events originate from the same source.

30. The system of claim 23, wherein each of the set of correlation types is any one of: a common ancestor correlation type, an overlap cause correlation type, an overlap cause-effect correlation type, and a common descendant correlation type.

31. The system of claim 30, wherein the common ancestor correlation type is determined when at least one advanced event is originated from a same ancestor source as a potential cyber-security threat.

32. The system of claim 19, wherein the system is further configured:
    factor at least one of: a number of correlated events and a number of identified correlation types.

33. The system of claim 32, wherein the system is further configured:
    factor in addition to the correlation score at least one of: a type of an identified potential cyber-security threat, a risk level associated with the identified potential cyber-security threat, and at least one cause-and-effect attribute, thereby resulting with the prediction score.

34. The system of claim 19, wherein each potential cyber-security attack is at least a multi-vector attack campaign.

35. The system of claim 19, wherein the multi-vector attack campaign is any one of: an insider threat campaign, a personal data-leak campaign, a ransomware campaign, an intelligence gathering, a financial data-leak campaign, and a denial-of-service (DoS) attack campaign.

* * * * *